No. 12,378. REISSUED AUG. 15, 1905.

H. T. KRAKAU & H. F. POPE.

DRAFT RIGGING.

APPLICATION FILED FEB. 10, 1905.

5 SHEETS—SHEET 1.

WITNESSES

R. A. Balderson

Warren W. Swartz

INVENTORS

Harry T. Krakau

Henry F. Pope by Bakewell & Byrnes

Their Atty's

No. 12,378. REISSUED AUG. 15, 1905.

H. T. KRAKAU & H. F. POPE.

DRAFT RIGGING.

APPLICATION FILED FEB. 10, 1905.

5 SHEETS—SHEET 2.

WITNESSES

R. A. Baldwin

Warren W. Swartz

INVENTORS

Henry T. Krakau

Henry F. Pope by Bakewell & Symes their attys

No 12,378. REISSUED AUG. 15, 1905.

H. T. KRAKAU & H. F. POPE.

DRAFT RIGGING.

APPLICATION FILED FEB. 10, 1905.

5 SHEETS—SHEET 3.

WITNESSES

R. A. Baldwin

Warren W. Swartz

INVENTORS

Harry T. Krakau

Henry F. Pope by Bakewell & Byrnes their attys

No. 12,378. REISSUED AUG. 15, 1905.

H. T. KRAKAU & H. F. POPE.

DRAFT RIGGING.

APPLICATION FILED FEB. 10, 1905.

5 SHEETS—SHEET 4.

WITNESSES

R. A. Dalderson

Warren W. Swartz

INVENTORS

Harry T. Krakau

Henry F. Pope by Baldwin & Bynes their Attys

No. 12,378. REISSUED AUG. 15, 1905.

H. T. KRAKAU & H. F. POPE.

DRAFT RIGGING.

APPLICATION FILED FEB. 10, 1905.

6 SHEETS—SHEET 5.

WITNESSES

R. A. Baldwin.

Warren W. Swartz

INVENTORS

Harry T. Krakau

Henry F. Pope by Bakewell & Byness their attys.

UNITED STATES PATENT OFFICE.

HARRY T. KRAKAU AND HENRY F. POPE, OF CLEVELAND, OHIO, ASSIGNORS TO THE NATIONAL MALLEABLE CASTINGS COMPANY, OF CLEVELAND, OHIO, A CORPORATION OF OHIO.

DRAFT-RIGGING.

No. 12,378. Specification of Reissued Letters Patent. Reissued Aug. 15, 1905.

Original No. 758,975, dated May 3, 1904. Application for reissue filed February 10, 1905. Serial No. 245,144.

*To all whom it may concern:*

Be it known that we, HARRY T. KRAKAU and HENRY F. POPE, of Cleveland, in the county of Cuyahoga and State of Ohio, have invented a new and useful Draft-Rigging, of which the following is a full, clear, and exact description, reference being had to the accompanying drawings, forming part of this specification, in which—

Figure 1:
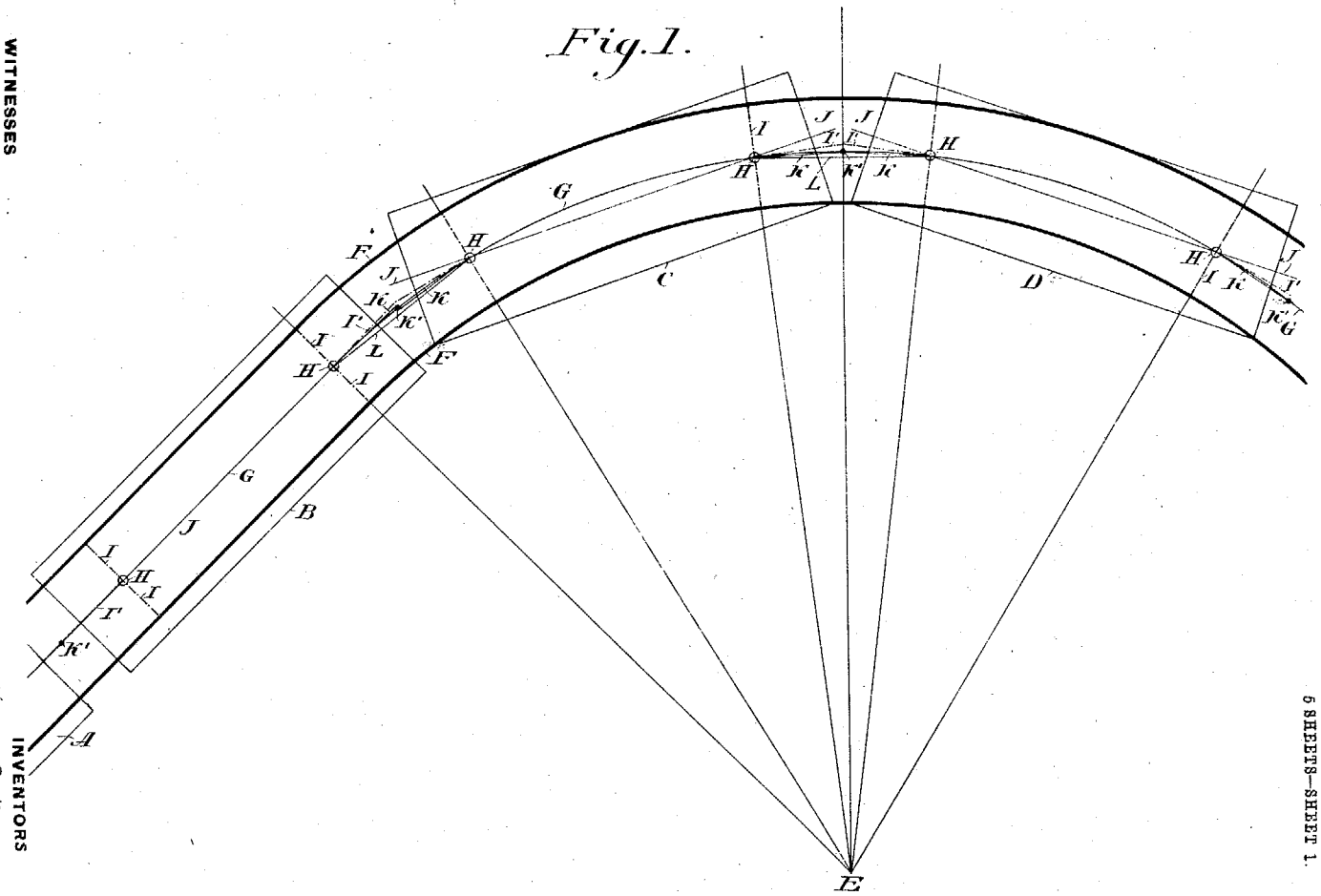
Figure 2:
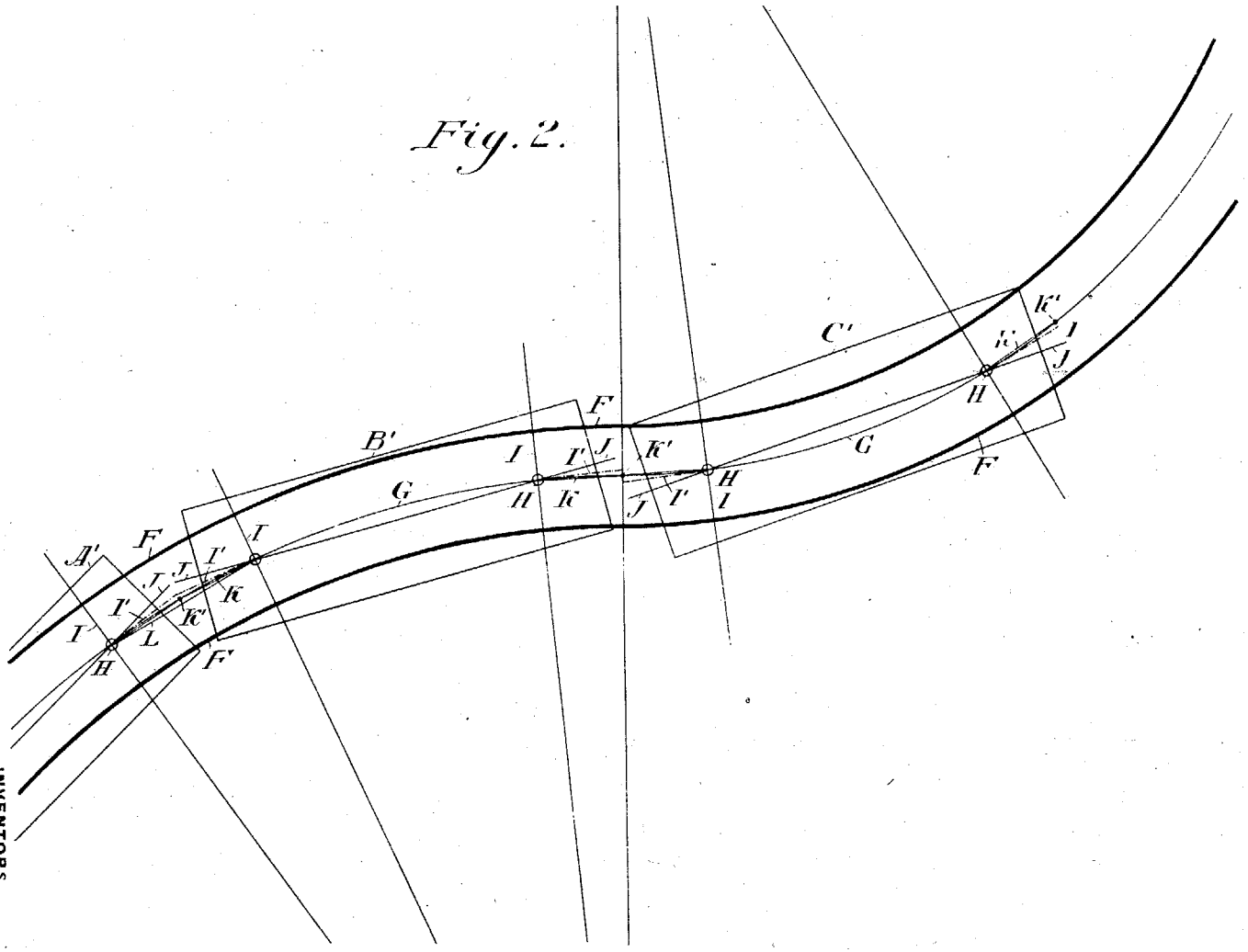
Figure 3:
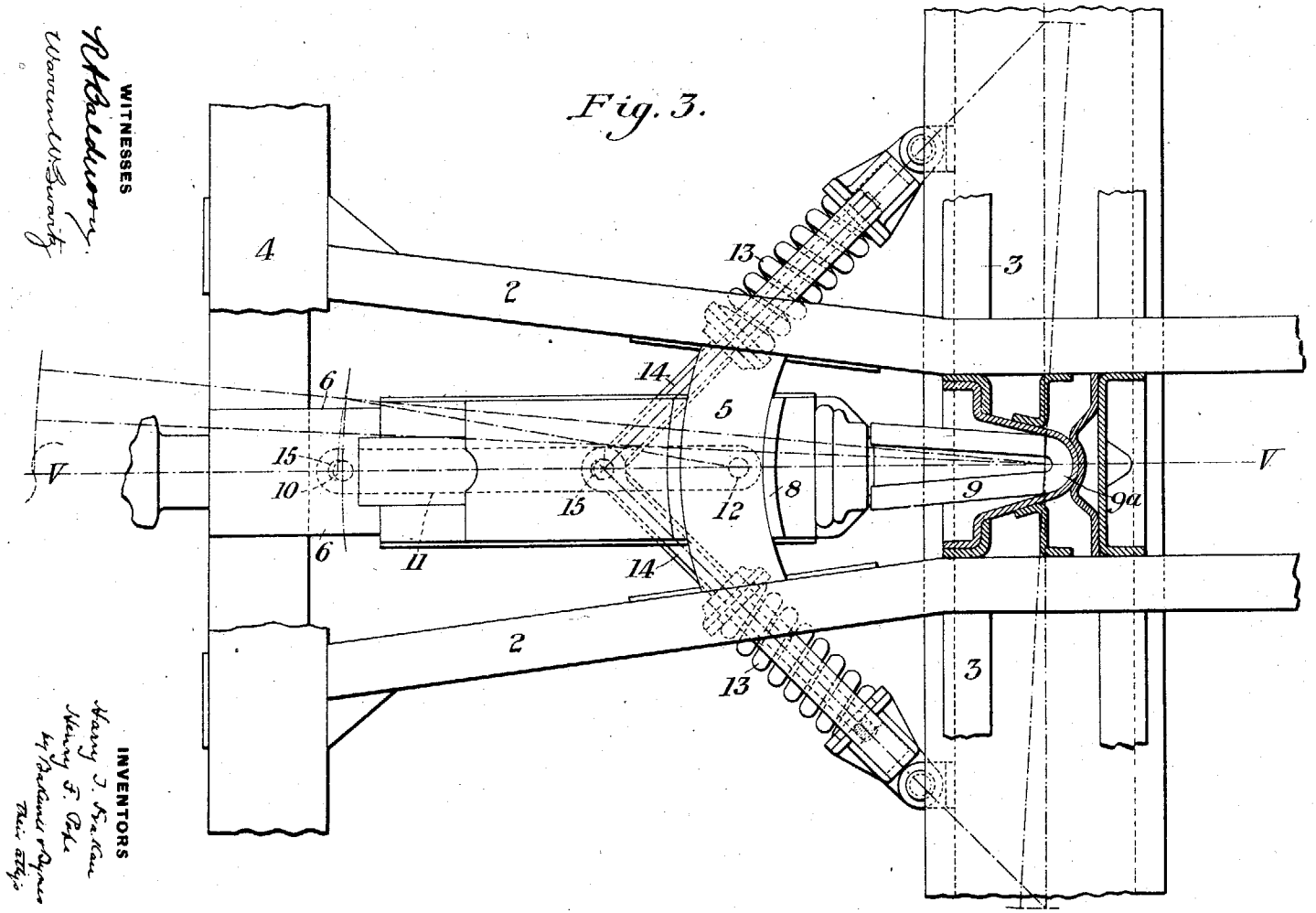
Figure 4:
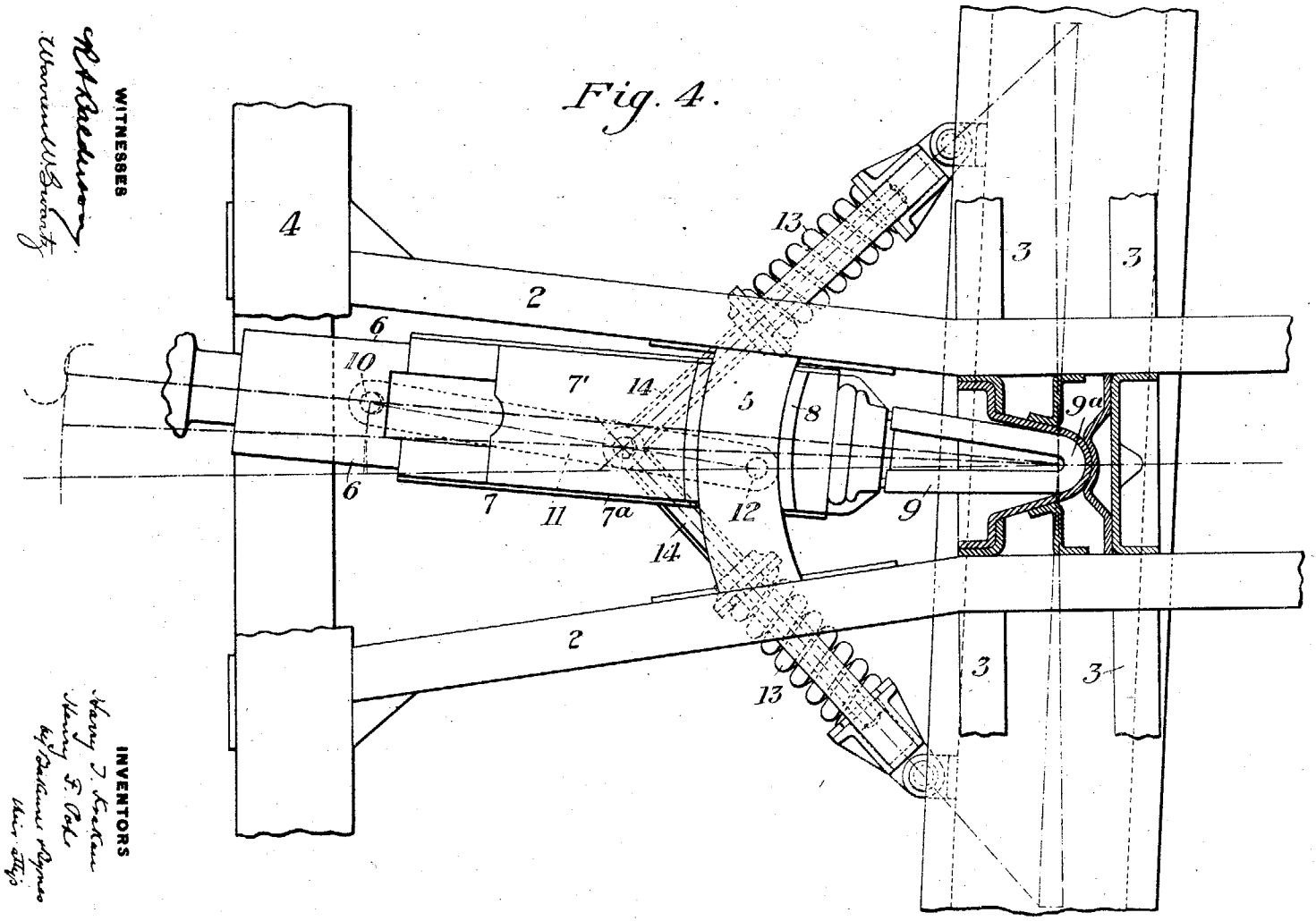
Figure 5:
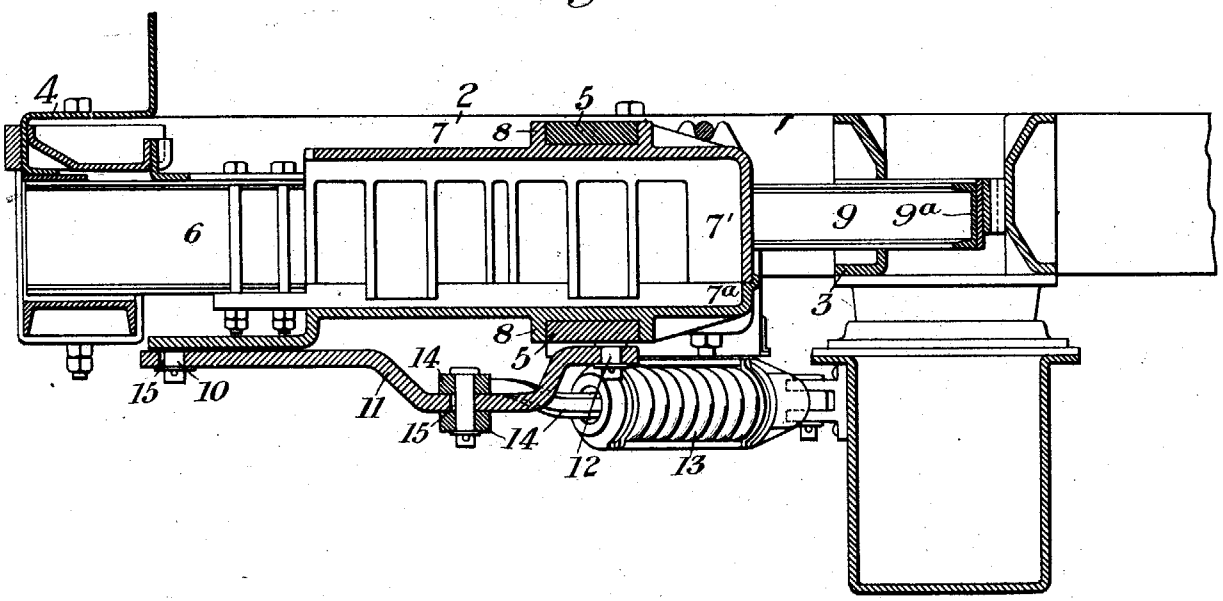

Figure 1 is a diagrammatic plan view showing three railway-cars passing from a tangent onto a curved portion of the track. Fig. 2 is a like view showing the cars passing around a reverse curve. For better illustration the conditions shown in these figures are somewhat exaggerated as compared with the conditions ordinarily experienced. Fig. 3 is a top plan view of the end portion of the underframe of a car, showing our improved draft-rigging in central position. Fig. 4 is a like view showing the same in deflected position as when rounding a curve. Fig. 5 is a longitudinal section on the line V V of Fig. 3.

Our invention relates to the draft-rigging for which Harry T. Krakau has already obtained Reissue Letters Patent No. 11,904 and Patent No. 721,570, in which the draft-rigging is pivoted at or near the center of rotation of the car-truck and is connected to the truck by a guiding connection, so as to swing laterally in harmony therewith, for the purpose of relieving the strain which would be put upon the sills and draft-timbers and upon the axle-box, journal-brasses, wheels, and rails if the draw-bar were mounted rigidly, or substantially so, on the car-body. When the draft-rigging is thus pivoted and is connected directly to the truck, the draw-bar will be held substantially at right angles to the truck, and while under ordinary conditions this will be sufficient to maintain the draw-bars of two adjoining cars substantially in line with each other when the cars are on a curve of large radius, still on very sharp curves it may be that the draw-bars will not be in line if the cars are uncoupled, and will thus render coupling difficult or if coupled that some strain will be imparted to the parts of the car.

Our invention is designed to avoid these difficulties; and it consists in providing means connecting the draw-bar to the truck in such manner that turning of the truck on its vertical axis will transmit to the draw-bar a lateral motion of greater extent than would be transmitted if the draft-rigging were directly connected to the truck by a simple connection, as shown in prior patents above referred to. The draw-bars will thus always be guided to the center of the track no matter what the degree of curvature of the latter may be, so that the couplers of two adjacent cars will always meet, and the draw-bars, with their draft-riggings, will thus so nearly occupy a straight line between the centers of the two trucks that when a pulling strain is applied to the train the couplers and draft-riggings will assume a straight line between the centers of the trucks, this position being made possible by the slightly-yielding connection which is preferably made with the trucks.

The evils which are remedied by our invention and the manner in which we remedy them are illustrated in Figs. 1 and 2. In Fig. 1 we show four cars A B C D, the cars C and D being shown in the position which they assume in rounding a curve described from the point E as a center and the cars A and B being shown upon a portion of the track which is tangent to the curve. F F represent the rails, and G the center line of the track. H is the center plate of the car, and I the line of the bolster. I′ is the normal position of the draft-rigging when it is perpendicular to the bolster. J is the central axis of the car-body. The line K illustrates the position of the draft-rigging when moved by our improvement to a greater extent than the movement of the truck around the curve would of itself produce, this movement preferably being such as to bring the draft-rigging so that the coupler will be moved to the center line G, as at K′. L represents the chord of the arc described by the center line G upon the curve struck from the center E and represents the position of the couplers of two adjacent cars when rounding a curve. Our invention enables us to bring the coupler to the center of the track, or nearly approximate thereto, so that cars provided with our improved draft-rigging may be coupled together upon a curve or at the point where the curve and the tangent to the curve meet, this being clearly shown in Fig. 1. The end of the line J represents the normal position of the coupler when mounted in a draft-rigging of the ordinary rigid type. The end of the line I′ represents the position of the coupler when mounted upon a draft-rigging of the swinging type shown in the prior patents of Krakau above mentioned, and the ends of the lines K, which meet at the point K′ upon the center line of the track, show the excess movement which our present invention enables us to obtain, employing the auxiliary connection between the truck and the draft-rigging. When our device is constructed so as to be yielding, the draft-riggings may be moved still farther, as indicated at L L, the draft-riggings then forming a straight line between their centers of motion on two adjacent cars when rounding a curve. In Fig. 2 the cars A′, B′, and C′ are shown on a reverse curve of the track, the center lines of the cars, track, and trucks being designated by the same letters as are used in Fig. 1 and the several positions of the draft-rigging with respect to the center line of the track being also marked with reference-letters which correspond to the same parts as are referred to in Fig. 1. It will thus be seen that we are enabled to maintain the couplers of uncoupled cars under all conditions at substantially the center line of the track and in the most advantageous position possible to permit coupling upon straight tracks or upon curves and to provide for a straight pull between the pivotal centers of the draft-riggings of adjacent coupled cars, which, as far as we know, has not been heretofore possible.

The preferable means which we employ to accomplish the purpose above stated is illustrated in the accompanying drawings; but it will be understood that our invention is not limited thereto and that the device may be modified in many respects.

In the drawings, 2 2 are the center sills of the car. 3 is the bolster, and 4 is the end sill. The center sills are secured to the end sill and preferably diverge somewhat from the bolster.

5 5 are curved segmental bars secured to the center sills and adapted to support the draft-rigging carrier.

The draft-rigging structure is a frame composed of draft-irons 6 6, secured to a carrier 7, which is preferably a casting composed of longitudinally-divided sections 7′ and 7ª, having at the top and bottom pockets 8, which are fitted to the segment-bars 5 5. At the rear of the carrier is an extension 9, bearing at its rear end in a socket 9ª, which is secured to the center sills and forms a central bearing on which the draft-rigging structure can turn pivotally. The pivotal connections of the draft-rigging to the car-body may be otherwise constructed, it being necessary only that the frame shall have a radial motion the center of which is preferably as near the center of the truck as possible. The usual resistance attachments comprising springs combined, if desired, with friction members and the necessary followers are mounted between the draft-irons, so that the swinging draft-rigging is a complete structure capable of receiving the strains of buffing and draft.

For the purpose of increasing the radial motion transmitted to the draft-rigging by the turning of the truck on its vertical axis as the car passes around a curve we do not connect the draft-rigging directly to the truck, but connect it thereto through an intermediate device, preferably a lever, by which its motion is increased. This device is illustrated in Figs. 3 and 4 and consists of a lever 11, which is pivoted at one end to a part of the car-body, preferably to the lower segment-bar 5 or to a pin 12 on said segment-bar, and at the other end is pivotally connected in like manner by a pin 10 to the draft-rigging frame or some part thereof. This lever is connected by guiding-rods 14 14 to the truck, and these rods are preferably provided with interposed springs 13, so that they shall be somewhat flexible and will permit the draft-rigging of two coupled cars to come to a straight line between their centers of motion as the cars round a curve. When the car passes around a curve, the turning of the truck relatively to the car-body will draw the lever 11 to one side or the other, and as the radius of the lever is shorter than the radius of the draft-rigging frame the lever will be deflected laterally through a greater arc than the draft-rigging frame would be if the rods 14 were connected directly to the latter. As the lever is connected to the draft-rigging frame at its forward end, it will cause the said frame to move laterally with it, and will thus accomplish the desired result of multiplying the extent of lateral motion of the draft-rigging caused by turning of the truck. The extent of motion of the draft-rigging relative to the motion of the truck can be determined as desired by appropriate location of the pivotal connection of the guiding-rods with the lever, and it may be increased beyond the point necessary to move the draft-rigging to the center of the track only. As the lever and the draft-rigging frame have unequal radii of motion, we connect the lever to the frame and the lever to the guiding-rods with a slotted connection 15 or other device suitable for permitting the desired independence of motion between these parts. Instead of a lever other equivalent mechanism for imparting to the draft-rigging a greater motion than would be imparted by a simple direct connection to the truck may be employed.

We claim—

1. A draft-rigging mounted on a car and adapted to swing laterally, and means connecting the same indirectly with the truck and adapted to transmit to the draft-rigging from the turning of the truck a greater motion than would be transmitted to it by a direct connection with the truck, said motion being adapted to guide the end of the draw-bar substantially to the center of the track, substantially as described.

2. A draft-rigging mounted on a car and adapted to swing laterally, and means connecting the same with the truck and adapted to transmit motion of increased extent to the draft-rigging from the turning of the truck, said means comprising a lever connected to the draft-rigging and to the car-frame and connected also to the truck, said motion being adapted to guide the end of the draw-bar substantially to the center of the track; substantially as described.

3. A draft-rigging mounted on a car and adapted to swing laterally, and means connecting the same with the truck and adapted to transmit to the draft-rigging from the turning of the truck, a greater motion than would be transmitted to it by a direct connection with the truck, said connecting means being yielding and adapted to permit the coupled draft-riggings of adjacent cars when on a curve to assume a straight line between their respective centers of motion, said motion being adapted to guide the end of the draw-bar substantially to the center of the track; substantially as described.

4. In combination with a car, a frame adapted to swing laterally and to carry a draw-bar and resistance attachments, and means connecting the same with the truck and adapted to transmit to the frame from the turning of the truck a greater motion than would be transmitted to it by a direct connection with the truck, said motion being adapted to guide the end of the draw-bar substantially to the center of the track; substantially as described.

In testimony whereof we have hereunto set our hands.

HARRY T. KRAKAU.
HENRY F. POPE.

Witnesses:
HARRY E. ORR,
S. L. SMITH.